United States Patent [19]

Persson

[11] 3,818,254

[45] June 18, 1974

[54] THERMALLY COMPENSATED CRYSTAL UNIT

[75] Inventor: Sten I. Persson, Naples, N.Y.

[73] Assignee: The Quality Corporation, Cleveland, Ohio

[22] Filed: Jan. 18, 1973

[21] Appl. No.: 324,570

[52] U.S. Cl. .................... 310/8.1, 310/8.9, 310/9.8, 319/210, 319/543, 319/501, 319/510

[51] Int. Cl. .................... H04r 17/00, H05b 3/06

[58] Field of Search .............. 310/9.7, 9.8, 8.9, 8.1; 319/209, 210, 501, 510, 543

[56] References Cited

UNITED STATES PATENTS

| | | | |
|---|---|---|---|
| 2,660,680 | 11/1953 | Koerner | 310/8.9 X |
| 3,201,621 | 8/1965 | Milner | 310/9.8 X |
| 3,431,392 | 3/1969 | Garland et al. | 310/8.9 X |
| 3,715,563 | 2/1973 | Bloch | 219/543 |

*Primary Examiner*—J. D. Miller
*Assistant Examiner*—Mark O. Budd
*Attorney, Agent, or Firm*—Woodling, Krost, Granger & Rust

[57] ABSTRACT

An apparatus for thermally compensating a piezoelectric crystal using electric current is disclosed and comprises a resistive heater and a resistive sensor each mounted to the surface of the crystal. The resistive sensor has a greater absolute value of temperature coefficient of resistivity than the resistive heater and is connected to the resistive heater to reduce the electric current to the resistive heater upon a temperature increase of the crystal. The foregoing abstract is merely a resume of one general application, is not a complete discussion of all principles of operation or applications, and is not to be construed as a limitation on the scope of the claimed subject matter.

12 Claims, 5 Drawing Figures

THERMALLY COMPENSATED CRYSTAL UNIT

BACKGROUND OF THE INVENTION

This invention relates to electrical generators or motor structures and more particularly to non-dynamo-electric piezoelectric devices with temperature modifier means.

The prior art has known many devices to compensate for temperature variations in a piezoelectric crystal or in other small devices. In some inventions variable pressure was applied to an axis of the crystal to stabilize the oscillating frequency during variations in temperature. Other prior inventions incorporated a heater inside the crystal housing or crystal can. The disadvantage of the heater in the crystal can was the large power required to heat the crystal. A significant advancement in crystal heating was made when a heater was mounted directly to the surface of the crystal. This enabled a significant reduction in the power required to heat the crystal and made the device practical for use with solid state circuits having low power consumption. However, the heated crystal still had the disadvantage of requiring a temperature sensor mounted inside the crystal housing with leads from the sensor to an external electronic control circuit. The sensor in many cases was large in relationship to the crystal and added to the bulk of the crystal housing. The crystal housing had to be provided with at least four leads in order to accommodate a heater and a sensor mounted inside the crystal housing.

Therefore, an object of this invention is to provide an apparatus for thermal compensation of a crystal incorporating a heating element on the crystal surface.

Another object of this invention is to provide an apparatus for thermal compensation of a crystal incorporating a resistive temperature sensor connected to the resistive heater to compensate for temperature variations of the crystal.

Another object of this invention is to provide an apparatus for thermal compensation of a crystal which uses all passive components without the need of any active electronic circuits.

Another object of this invention is to provide an apparatus for thermal compensation of a crystal which is mounted on the surface of the crystal to achieve a miniaturized crystal housing.

Another object of this invention is to provide an apparatus for thermal compensation of a crystal which is reliable.

Another object of this invention is to provide an apparatus for thermal compensation of a crystal which is inexpensive to produce.

SUMMARY OF THE INVENTION

The invention may be incorporated in an apparatus for thermal compensation with electric current of a material, comprising in combination, resistive means with a portion thereof having an anomaly temperature at which the coefficient of resistivity changes by a factor of at least two, means for establishing the electric heating current to said resistive means, and means for establishing said resistive means to be in thermal contact with the material to heat the material by said resistive means and to reduce the electric heating current to said resistive means by action of said resistive means when the temperature of the material is above said anomaly temperature.

Other objects and a fuller understanding of the invention may be had by referring to the following description and claims, taken in conjunction with the accompanying drawing.

DESCRIPTION OF THE PREFERRED EMBODIMENT

Figure 1:
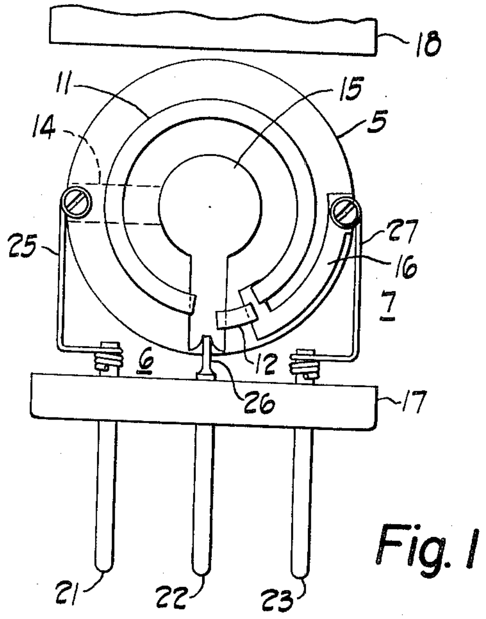
FIG. 1 is the preferred embodiment showing a front view of a piezoelectric crystal incorporating the invention.

FIG. 1 is a front view of an apparatus using electric current for thermal compensation of a material 5 shown as a piezoelectric crystal which comprises resistive means 6, means 7 for establishing electric current to the resistive means 6, and means for establishing the resistive means 6 to be in thermal contact with the material 5. The resistive means 6 is shown having a resistive heater 11 and a resistive sensor 12 wherein the resistive sensor 12 has an anomaly temperature at which the coefficient of resistivity changes by a factor of at least two. The resistive means 6 is established to be in thermal contact with the material 5 to heat the material 5 by the resistive means 6 and to reduce the electric heating current to the resistive means 6 by action of the resistive means 6 when the temperature of the material 5 is above the anomaly temperature.

The apparatus can also be considered to comprise first means shown as the resistive heater 11 for heating the material 5 by electric current and second means shown as the resistive sensor 12 for sensing the temperature of the material 5. The resistive sensor 12 has a greater absolute value of temperature coefficient of resistivity than the resisitve heater 11 and by interconnection of the resisitve heater 11 and the resistive sensor 12, a reduction in the electric current to the resistive heater 11 is accomplished upon a temperature increase of the material 5.

The preferred embodiment, FIG. 1, shows the piezoelectric crystal 5 to have a first and a second electrode 14 and 15 established unitary with the crystal 5. The crystal 5 is shown as a thin wafer having a first and second side wherein the first electrode 14 is located on the first or rear side shown in FIG. 1 and the second electrode 15 is shown on the front or second side of the crystal 5. The electrodes can be of a metallic material such as gold or silver deposited by vacuum deposition, sputtering or conventional mechanical techniques such as painting or silk screening. The crystal 5 is enclosed in a housing which comprises a base 17 and a cover 18 shown separated but capable of covering the crystal 5 and sealing with the base 17. The base 17 secures a first, second and a third terminal 21–23 to make electrical connection between the crystal 5 and an external circuit. The first terminal 21 is connected by a wire 25 to the first electrode 14 whereas the second terminal 22 is connected by a connector 26 to the second electrode 15. The crystal 5 includes a third electrode 16 on the front side of the crystal and which may be similar in construction to the first and second electrodes 14 and 15. Electrode 16 is shown having a portion following the outside curvature of the crystal 5 and a portion along a radius from the center of the crystal 5 and which is partially covered by and connected to the resistive heater 11. A wire 27 connects the third terminal 23 to the third electrode 16. The wires 25 and 27 and the connector 26 are generally arranged to have a high electrical conductivity but low thermal conductivity to make the crystal 5 less susceptible to changes in temperature caused by heating or cooling of the terminals 21–23.

The resistive heater 11 is shown having an arcuate geometry and established between the second electrode 15 and the third electrode 16 on the front side of the crystal. The resistive heater 11 can be made of any electrical conductive material and even a highly conductive material such as gold or silver if the thickness of the resistive heater 11 is selected to produce a resistance sufficient to enable resistive heating. Experiments have shown that a thin film of gold deposited by vacuum deposition having a resistance of 500 to 1,500 ohms is suitable for use with a crystal having an overall diameter between 5 and 10 millimeters. However, any resistive material can be used in any geometry to enable a uniform heating of the crystal 5.

The resistive sensor 12 is shown on the front side of the crystal interconnecting the second electrode 15 and the third electrode 16 and established in parallel with the resistive heater 11. A crystal signal circuit is established between the first and second terminals 21 and 22 to enable connection of the crystal 5 to an external circuit. A resistive heater circuit is established between the second and third terminals 22 and 23 to temperature compensate the crystal 5. Only three terminals are required since the second terminal 22 is common to both the crystal signal circuit and the resistive heating circuit. The resistive heater 11 and resistive sensor 12 are shown being in thermal contact with the crystal 5 but either the resistive heater 11 or the resistive sensor 12 can be spaced from the crystal 5 as long as a thermal coupling exists with the crystal 5. Thermal contact with the crystal 5 may be achieved through an intermediate material.

Figure 2:
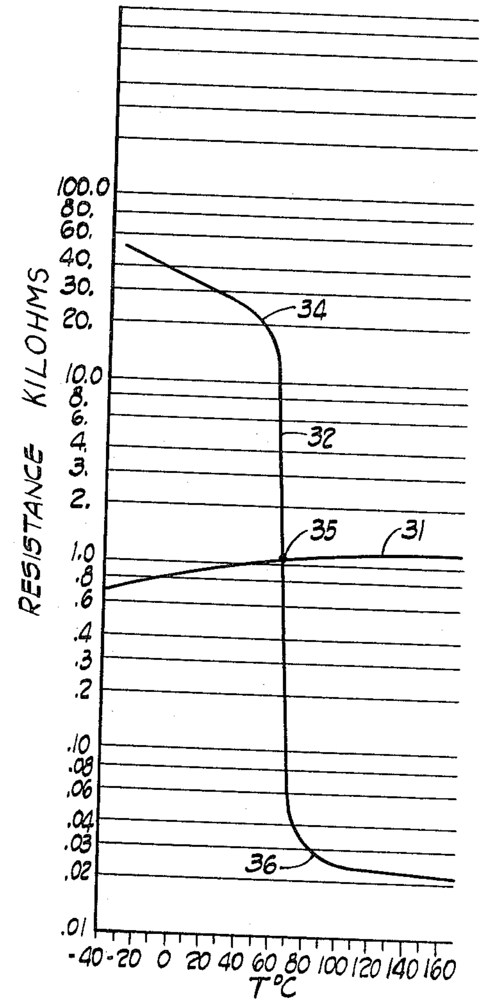
FIG. 2 is a graph of resistance versus temperature for a resistive heater and a resistive sensor shown in FIGS. 1 and 4.

FIG. 2 is a graph of resistance plotted on a log scale as a function of temperature wherein a curve 31 represents the resistance of the resistive heater 11 whereas a curve 32 represents the resistance of the resistive sensor 12. The temperature coefficient of resistivity of the gold resistive heater 11 in curve 31 is very small being approximately 0.0034 per degree centrigrade as shown by the substantially uniform resistance with temperature. The temperature coefficient of resistivity of the resistive sensor 12 shown by curve 32 has a small absolute value until obtaining an anomaly temperature 34 at which the temperature coefficient changes by a factor of at least two. At temperatures below the anomaly temperature 34, the resistance of the resistive sensor 12 is high relative to the resistance of the resistive heater 11 but at temperatures above the anomaly temperature 34 the resistance of the resistive sensor 12 decreases to equal the resistance of the resistive heater 11 at a point 35 and continues to decrease until obtaining a second anomaly temperature 36 wherein the coefficient of resistivity of the resistive sensor 12 returns again to a small absolute value. The resistivity and geometry of the resistive heater 11 and the resistive sensor 12 are matched in the preferred embodiment to intersect between the anomaly temperatures 34 and 36 of the resistive sensor 12. The resistive sensor 12 has an anomaly temperature range between anomaly temperatures 34 and 36 at which the coefficient of resistivity changes by at least one order of magnitude. The anomaly temperature range between 34 and 36 is narrow relative to the ambient temperature range, e.g. 0° to 140° C of the environment. It is desirable to have a resistive sensor which has a resistance change of many orders of magnitude between the first and second anomaly temperatures 34 and 36 and which has a change in a region therebetween of three orders of magnitude within a temperature range of 10° centigrade. Such a material is available under the trademark "TYOX" sold and distributed by the E. I. du Pont de Nemours & Co., Inc. However, any material having similar characteristics is suitable for use with this invention.

The thermal compensation of the crystal 5 is accomplished by interaction of the resistive heater 11 and the resistive sensor 12. An external source of electrical power, not shown, is applied between the second and third terminals 22 and 23 to heat the crystal 5 by the resistive heater 11.

Figure 3:
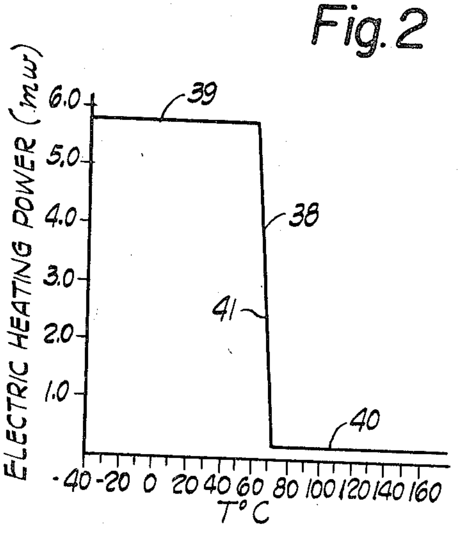
FIG. 3 is a graph showing power as a function of temperature to the resistive heaters in FIGS. 1 and 4.

FIG. 3 is a graph having a power curve 38 of the electric heating power to the resistive heater 11 as a function of temperature of the crystal 5. The power curve 38 of FIG. 3 does not include the current through the resistive sensor 12 but consists only of the current and voltage delivered to the resistive heater 11. Current from the external source produces electrical heating power in the resistive heater 11 as shown by FIG. 3 in a region 39. Power is continuously furnished to heat the crystal 5 to an operating temperature determined by the anomaly temperature of the resistive sensor 12. Since the resistive heater 11 is in thermal contact with the crystal 5, only a small amount of power is required to heat the crystal 5. As the temperature increases from an ambient of approximately 25° C, power is continuously delivered to the resistive heater 11 as designated by the region 39. When the temperature of the crystal 5 is below the anomaly temperature 34 in FIG. 2, the resistive sensor 12 is a high resistance relative to the resistance of the resistive heater 11 as shown by the curves 31 and 32. When the temperature of the crystal 5 increases to the anomaly temperature 34, the coefficient of resistivity of the resistive sensor 12 radically changes and the resistance of the resistive sensor 12 decreases as the temperature of the crystal increases above 60° C. The decrease in resistance is very rapid in this range being approximately three orders of magnitude between 60° and 70° C. As the resistance of the resistive sensor 12 decreases, a portion of the current between terminals 22 and 23 flows through the resistive sensor 12 to shunt electrical power from the resistive heater 11. A continued increase in temperature of the crystal 5 results in equal currents in the resistive heater 11 and the resistive sensor 12 corresponding to the intersection of the curves 31 and 32 at the point 35. An additional temperature increase of the crystal 5 causes substantially all of the current to pass through the resistive sensor 12 thereby shunting electric heating current from the resistive heater 11. Above the anomaly temperature 36 little power is delivered to the resistive heater 11 as indicated by a region 40 in FIG. 3. The temperature of the crystal 5 will stabilize between the anomaly temperatures 34 and 36 and will vary about the point 35 of the curves 31 and 32 whereat equal currents will flow in the resistive heater 11 and the resistive sensor 12. For large temperature variations of approximately 20°–30° C, the resistive sensor 12 functions substantially as a switch whereby below the anomaly temperature 34 the switch is off whereas above the anomaly temperature 36 the switch is on. For small temperature variations of approximately 2°–3° C, the finite slope of the curve 32 between the anomaly temperatures 34 and 36 results in a proportional controlling of the temperature of the crystal 5 about the point 35. The proportional power delivered to the resistive heater 11 between the anomaly temperatures 34 and 36 is illustrated by a region 41 of the curve 38 in FIG. 3. If a resistive sensor 12 has a negative coefficient of resistivity then the resistive sensor 12 must be connected in parallel with the resistive heater 11 whereas if a resistive sensor 12 has a positive temperature coefficient, then the resistive sensor 12 must be connected in series with the resistive heater 11. The ideal behavior for a resistive sensor is to switch at a critical temperature between an infinite and a zero impedance. However, since no such material is presently available, the resistive sensor 12 should have a behavior that gives the greatest variation of electrical power through the resistive heater 11 that is mathematically possible. The maximum variation is obtained only by the matching and cooperation of the resistive heater 11 and the resistive sensor 12.

Figure 4:
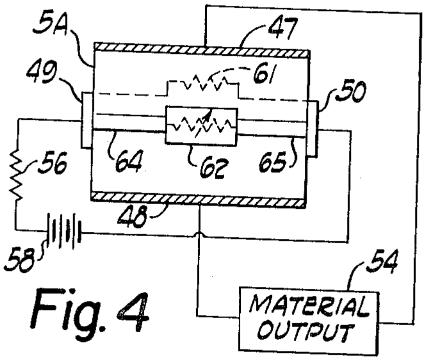
FIG. 4 is an application of the invention to a conductive material.

FIG. 4 is a modification of FIG. 1 showing the invention applied to a conductive material 5A such as a solid state crystalline or amorphous material. The material 5A is shown having four electrodes 47, 48, 49 and 50 which are located on four sides of the material 5A. This geometry is merely a matter of choice since the invention is equally suitable with many geometric variations. The electrodes 47 and 48 are connected to a material output stage 54 for utilizing the function of the material 5A. The electrodes 49 and 50 are connected in an external circuit including a resistor 56 and a source of electrical current shown as a battery 58. The electrodes 49 and 50 are established to be in contact with the material 5A to enable resistive heating through the material 5A as symbolized by a phantom resistor 61. A resistive sensor 62 similar to that shown in FIGS. 1–3 is established to be in thermal contact with the surface of the material 5A and connected to the electrodes 49 and 50 by conductors 64 and 65, respectively. The resistive sensor 62 could also be thermally coupled to the material 5A and spaced therefrom. The resistor 56 can be selected to be equal to the resistance of the material resistance 61. For a material 5A having a resistance of 1,000 ohms, a resistor 56 having a resistance of 1,000 ohms and a battery of 5 volts has been found to be a suitable choice of values.

The circuit shown in FIG. 4 operates identically to the invention described in FIGS. 1–3. When the material 5A is at a temperature below the anomaly temperature 34 of FIG. 2, electrical heating power is delivered to the material 5A illustrated by the region 39 of FIG. 3. Due to the internal heating, only 6 milliwatts of heating power is required to heat the material 5A. When the temperature of the material 5A increases above the anomaly temperature 34, the resistive sensor 62 decreases in resistance to shunt electrical heating current from the material resistance 61. Above the anomaly temperature 36 only a minute amount of electric heating current flows through the material resistance 61. The circuit shown in FIG. 4 operates in both the switching mode and the proportional mode as previously described and can be applied to any material which is sufficiently conductive to operate as a resistive heater. Piezoelectric crystals typically do not have sufficient conductivity to enable heating directly through the crystal material. This invention is applicable to various types of solid state devices such as transistors, silicon controlled rectifiers, photoresistors, integrated circuits and the like.

Figure 5:
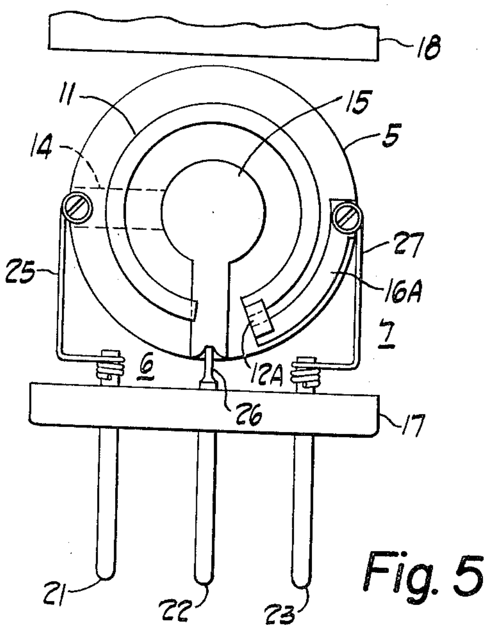
FIG. 5 is a modification of the invention shown in FIG. 1.

FIG. 5 is a modification of the preferred embodiment wherein the crystal 5 has a first, second and third electrode 14, 15 and 16A in a similar arrangement to that shown in FIG. 1. The third electrode 16A comprises only a portion following the outside curvature of the crystal 5. The resistive heater 11 is thermally contacting the surface of the crystal 5 and connected to the second electrode 15. The other end of the resistive heater 11 is connected to the electrode 16A by resistive sensor 12A to establish the resistive sensor 12A in series with the resistive heater 11 between the second and third terminals 22 and 23. In this embodiment the resistive sensor 12A has a positive coefficient of resistivity to produce a high series resistance upon an increase in temperature of the crystal 5. Matching of the resistive heater 11 and resistive sensor 12A is accomplished in a manner similar to FIGS. 1–4 except the resistive sensor 12A is selected to produce a low series resistance relative to the resistive heater 11 at a temperature below the anomaly temperature and to produce a high series resistance relative to the resistive heater 11 at a temperature above the anomaly temperature. The positive coefficient resistive sensor 12A would have a resistance versus temperature curve similar to curve 32 if curve 32 were rotated 180° about a horizontal line passing through the point 35. An example of a material which has a positive temperature coefficient of resistivity and a higher anomaly temperature than the aforesaid "TYOX" is Lanthanum doped Barium Titanate.

The resistive heater 11 and the resistive sensor 12A in FIG. 5 have been shown to be two distinct devices but the invention can incorporate a positive temperature coefficient of resistivity device which is in thermal contact with the crystal 5 to simultaneously operate as a resistive sensor and a resistive heater. Such a resistive means is considered to be within the scope of this invention. When a single resistive means is used for heating and sensing, the anomaly temperature at which the coefficient of resistivity changes by at least a factor of two is the significant portion of the curve and a multiple discontinuity in the resistance such as 34 and 36 in FIG. 2 is not required.

FIGS. 1, 4 and 5 illustrate distinct structures for the practice of this invention and consequently the invention in addition to residing in the structure resides in the method of thermally compensating a material. The method of thermally compensating a material with a resistive sensor which resisitve sensor has an anomaly temperature at which the coefficient of resistivity changes by a factor of at least two, comprises steps of heating the material with the electric current. The step of heating the material can be accomplished by mounting a resistive heater 11 to the material 5 and connecting the resistive heater 11 to a source of electric current as shown in FIG. 4. The next step of the method is thermally contacting the resistive sensor 12 to the material 5. The step of thermally contacting can be done in one of the many ways known to the art such as evaporation or mechanical techniques and includes contacting the material 5 with the resistive sensor 12 through a heat conductive intermediate substance. The next step to the method is connecting the resistive sensor 12 to the electric circuit to reduce the electric current heating the material 5 when the temperature of the material 5 increases above the anomaly temperature of the resistive sensor 12. The step of connecting the resistive sensor 12 can include connecting the resistance sensor 12 across a substantial portion of the resistive heater 11 as shown in FIG. 1 producing a low resistance shunt across the resistive heater 11 when the temperature of the material 5 increases above the anomaly temperature.

The method may also be described as a method of thermally compensating the material 5 with a resistive heater 11 and a resistive sensor 12 in which the resistive sensor 12 has a greater absolute value of temperature coefficient of resistivity than the resistive heater 11, which includes depositing the resistive heater 11 to be in thermal contact with the material 5. The step of depositing may include transporting minute particles of an electrical resistive substance from a source to impinge on the material 5 by techniques such as evaporation, sputtering or vapor transport. The next step in the method is connecting the resistive heater 11 to a source of electric current as shown in FIG. 4. The next step in the method is to apply the resistive sensor 12 to be in thermal contact with the material 5. This application may include applying the resistive sensor in a liquid form by brushing, silk-screening and the like. The final step includes connecting the resistive sensor 12 to the resistive heater 11 to reduce the electric current to the resistive heater 11 upon a temperature increase of the material 5.

This disclosure has described the foregoing invention in terms of a piezoelectric crystal and a semi-conductor material, but these descriptions are only in the way of examples and are not to be construed as limitations upon the invention. The invention can be applied to any relatively small mass material wherein a thermal compensation is desired in a small volume. The invention is applicable to all types of small mass materials and using either a positive or a negative temperature coefficient resistive sensor.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An apparatus for thermal compensation of a material, comprising in combination:

first means in thermal contact with said material for heating the material by electric current;

second means in thermal contact with said material for sensing the temperature of the material;

said second means having a greater absolute value of temperature coefficient of resistivity than said first means;

and means for directly connecting said second means to said first means for controlling the electric current to said first means in accordance with the resistance of said second means relative to the resistance of said first means.

2. An apparatus as set forth in claim 1, wherein said first means includes a resistive heater in thermal contact with the material, and said second means includes a resistive sensor in thermal contact with the material.

3. An apparatus as set forth in claim 1, wherein said second means has a negative temperature coefficient of resistivity.

4. An apparatus as set forth in claim 3, wherein said connecting means connects said second means in parallel with a substantial portion of said first means.

5. An apparatus as set forth in claim 1, wherein said second means has a positive temperature coefficient of resistivity, and said connecting means connects said second means in series with said first means.

6. An apparatus to temperature compensate a crystalline material, comprising in combination:

a resistive heater having a given resistance and being in thermal contact with the material;

means for connecting said resistive heater to a source of electric current to heat the material to an operating temperature;

a resistive sensor having a negative coefficient of resistivity and established across at least a portion of said resistive heater;

and means for establishing said resistive sensor to be in thermal contact with the material to produce a low parallel resistance relative to said given resistance at a material temperature above said operating temperature and to produce a high parallel resistance relative to said given resistance at a material temperature below said operating temperature.

7. An apparatus to temperature compensate a crystal wherein the crystal has a first and a second electrode established unitary therewith, comprising in combination first, second and third terminals;

means for connecting said first terminal to the first electrode;

means for connecting said second terminal to the second electrode producing a crystal circuit between said first and second terminals;

a resistive heater having a given resistance and being in thermal contact with the material;

means for connecting said resistive heater between said second and third terminals;

and a resistive sensor thermally coupled to the material and connected in parallel with said heater and having a negative coefficient of resistivity established to produce a low parallel resistance relative to said given resistance across at least part of said resistive heater upon an increase in crystal temperature and to produce a high parallel resistance relative to said given resistance across at least part of said resistive heater upon a decrease in crystal temperature.

8. An apparatus to temperature compensate a piezoelectric crystal wherein the crystal has a first and a second electrode established unitary with and on a first and a second side, respectively, of the crystal, comprising in combination:

a base;

first, second and third termnals;

means for mounting said terminals to said base;

means for connecting said first terminal to the first electrode;

means for connecting said second terminal with the second electrode producing a crystal circuit between said first and second terminals;

a resistive heater having a first and a second end established on the surface of the second side of the crystal with said second end connected to the second electrode, said resistive heater having a given resistance and an arcuate geometry with said first end in close proximity to said second end;

means for connecting said first end to said third terminal to provide a resistive heater circuit between said second and third terminals to heat the crystal to an operating temperature with electric current;

at least two of said terminals supporting the crystal relative to said base;

a resistive sensor having a negative coefficient of resistivity established in thermal contact with the crystal and connected between the first and second ends of said resistive heater;

and said resistive sensor producing a low resistance shunt relative to said given resistance across said resistive heater at a crystal temperature above said operating temperature and producing a high resistance shunt relative to said given resistance at a crystal temperature below said operating temperature to compensate for temperature variation of the crystal.

9. A method of thermally compensating a material comprising in combination:

heating the material in an electric circuit by mounting a resistive heater to the material and connecting the heater to a source of electric current;

thermally contacting a resistive sensor to the material with the resistive sensor having an anomaly temperature range at which the coefficient of resistivity changes by a factor of at least ten;

and connecting the resistive sensor across a substantial portion of the resistive heater producing a low resistance shunt across the resistive heater when the temperature of the material increases above the anomaly temperature.

10. A method of thermally compensating a material, comprising in combination:

depositing a resistive heater to be in thermal contact with the material;

connecting the resistive material to a source of electric current;

applying a resistive sensor having a greater absolute value of temperature coefficient of resistivity than the resistive heater to be in thermal contact with the material;

and directly connecting the resistive sensor to the resistive heater to control the electric current to the resistive heater in accordance with the resistance of the resistive sensor relative to the resistance of the resistive heater.

11. A method as set forth in claim 10, wherein the step of depositing includes transporting minute particles of an electrical resistive substance from a source to impinge upon the material.

12. A method as set forth in claim 10, wherein the step of applying includes applying the resistive sensor material in a liquid form.

* * * * *